Figure 1:
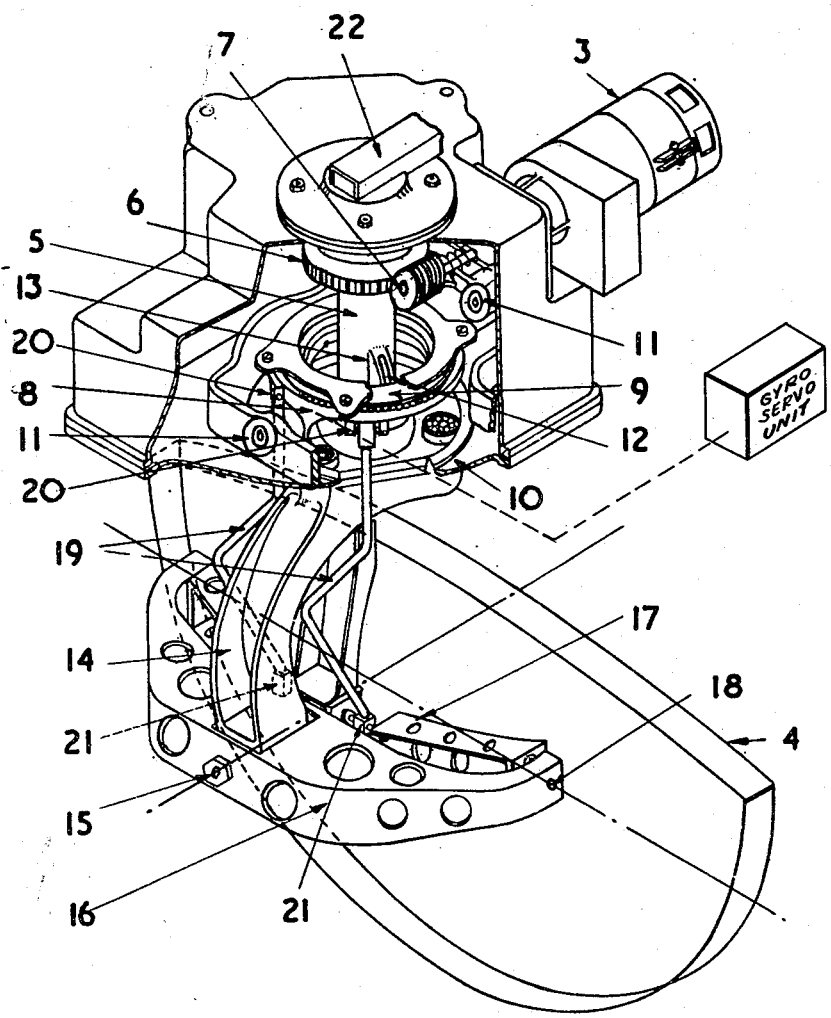

Patented May 1, 1951

2,551,180

UNITED STATES PATENT OFFICE 2,551,180

RADIO ECHO SYSTEM

Arthur Tisso Starr, New Barnet, and Victor John Hay, Great Malvern, England

Application July 29, 1947, Serial No. 764,514
In Great Britain February 1, 1946

Section 1, Public Law 690, August 8, 1946
Patent expires February 1, 1966

8 Claims. (Cl. 250—33.65)

This invention relates to radio echo systems of the mechanically-operated, directional scanning beam type; that is to say, to systems of the type in which a highly-directional radio beam transmitted from a radio directional member (such for example as an aerial or radio mirror) is caused repeatedly to traverse a predetermined scanning path in space by mechanically moving the said member. In systems of the type referred to, when the beam strikes an object capable of reflecting radio waves, the reflected energy is received and employed to operate means for indicating the presence of the reflecting object; in some such systems, a separate receiving aerial system is employed, whereas in others, a common aerial or its equivalent is employed both for transmission and reception, and the present invention is applicable to both forms of system.

Difficulties are met with when a radio echo system of the type referred to is installed on shipboard or in an aircraft, due to the effects of rolling, pitching or yawing of the craft; for it will be appreciated that when the ship or aircraft rolls, or otherwise departs from a steady normal disposition, the scanning beam will not follow the required predetermined path in space unless special measures are adopted to ensure that it does. In general, rolling is the most troublesome difficulty. It has been the practice hitherto to seek to avoid this difficulty by mounting the whole transmitting unit, comprising the radio directional member and its mechanical driving means, in a carrier which is gyroscopically controlled so that the transmitting unit remains substantially stationary (apart from the required scanning movements of the directional member) despite roll or other movement of the craft to which the apparatus is fitted. This kind of arrangement presents the practical defect that it is apt to be clumsy, since the weight of the apparatus required to be gyroscopically steadied is substantial; moreover, allowance must be made for movement of the carrier of the gyroscopically steadied apparatus which, since it is a direct and simple function of the roll or other movement of the craft, may be of substantial magnitude.

The present invention seeks to provide an improved radio echo system of the type referred to, in which compensation for rolling or other movement of the craft is effected by apparatus arranged so that the weight and size of the parts to be gyroscopically steadied is relatively small.

According to the present invention, there is provided a radio echo apparatus of the type referred to, comprising driving means for causing a radio directional member to perform a desired scanning motion, said driving means and said member being coupled so that relative movement between them may take place, and gyroscopically-steadied means so arranged that the motion of said member in scanning involves a degree of movement relative to said driving means which is determined by the orientation of said gyroscopically-steadied means.

The radio directional member may take any known or suitable form; for example, it may be a directional aerial or aerial system, a radio mirror, or a so-called waveguide flare.

For the sake of simplicity in description, the invention will in the first place be particularly described as applied to the correction of roll, since this in practice is the major cause of trouble. It will be apparent from the description which follows, however, that the invention may be equally applied to correction of other errors, e. g. those due to pitch.

Figure 2:
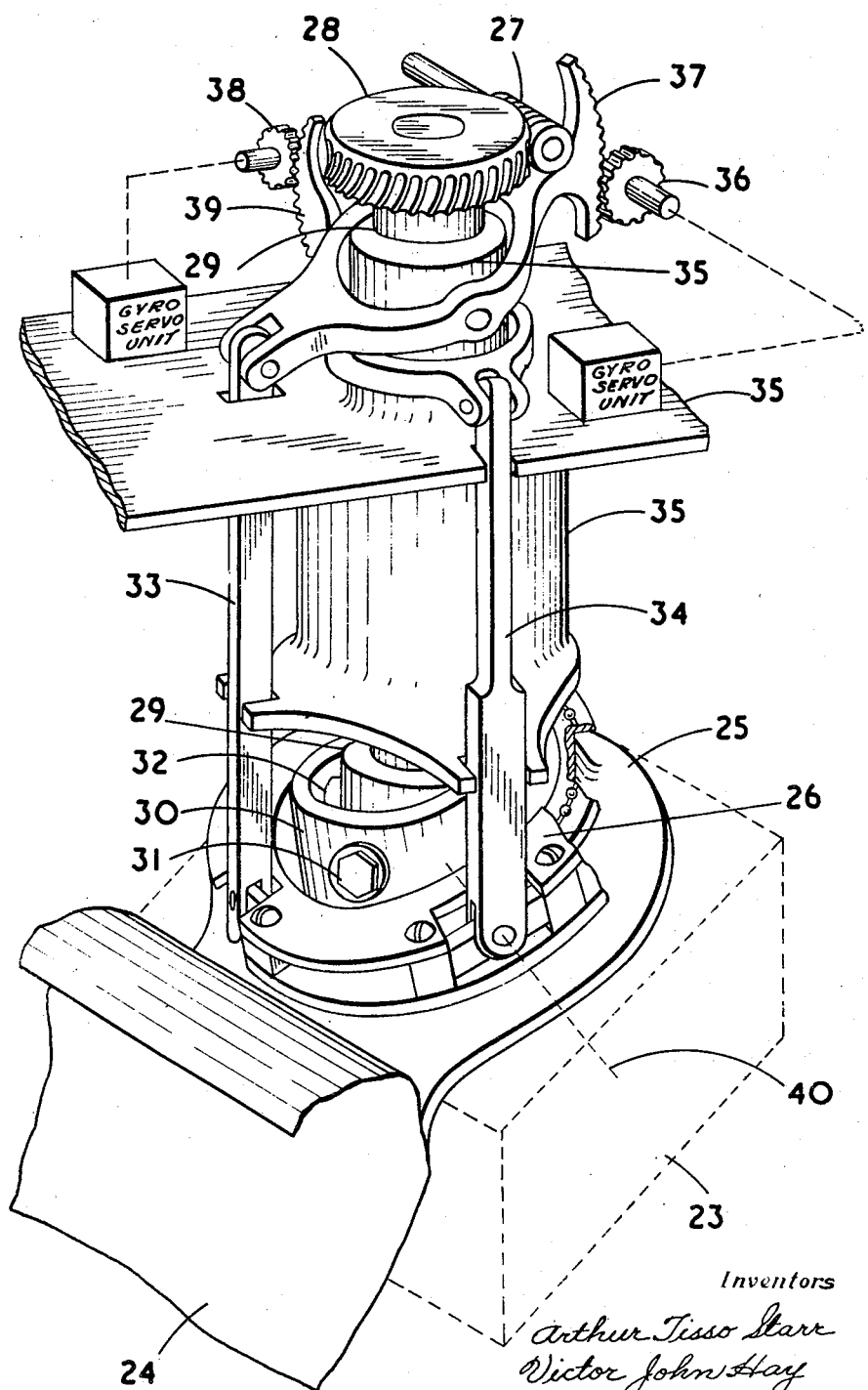

In order that the nature of the invention may be more clearly understood, two preferred forms of stabilising arrangement embodying the invention will now be more fully described by way of example with reference to the accompanying drawings, in which Figs. 1 and 2 illustrate the two embodiments respectively.

Referring to Fig. 1, an electric motor 3 drives a radio mirror 4 back and forth (or continuously round and round) to scan in azimuth by driving an azimuth shaft 5 through the worm and worm wheel 6, 7. The shaft 5 passes down through a small gyro-stabilised platform constituted by a ring 8 (which may, in practice, be about 4″ in diameter) inside which runs another ring 9 on ball bearings. The main frame and housing 10 is fixed to an aircraft carrying the apparatus, and the two rings 8 and 9 are able to roll with respect to the main frame 10 by rotating upon fore and aft bearings 11 mounted on the main frame. As the shaft 5 rotates, it also rotates the ring 9 through the medium of a pin (not shown) which slides in a slot 12 in a boss 13 on the shaft 5, the shaft 5 itself being carried by bearings (not shown) situated one above the worm wheel 6 and another below the main frame 10. The pin and slot coupling between the shaft 5 and ring 9 is semiuniversal in character in that it permits the ring 9 to tilt about the axis of bearings 11 relatively to the shaft 5 while maintaining the rotational drive from the shaft to the ring.

At its lower end, the azimuth shaft 5 is bolted to a bracket 14 which carries, by means of two horizontal swivel pins (of which one, 15, is shown)

a rocker member 16. A mirro-support band 17 riveted to the mirror 4 is carried from the rocker member 16 by means of a pair of horizontal swivel pins (of which one, 18, is seen in the drawing) whose axis is at right angles to that of the pins 15. Rods 19, attached by Hooke's or equivalent universal joints 20 to the ring 9 and by similar joints 21 to the band 17, connect the band 17 to the ring 9. The joints 20 are so positioned on the ring 9 that when the mirror is pointing dead ahead (as shown) the joints 20 are equidistant on opposite sides of the axis of the bearings 11. Radio energy for transmission is fed to the mirror through a waveguide 22 which passes down inside shaft 5 and is coupled to a waveguide orifice (not shown) positioned to direct energy into the mirror by means of a length of flexible guide (not shown) coupled to guide 22 through a rotating joint.

The stabilised platform 8 is maintained steady by a gyroscope servo unit of any known or suitable form, as diagrammatically illustrated in Fig 1.

The operation of the apparatus is as follows. If the aircraft banks or rolls, the azimuth shaft 5 maintains its position with respect to the aircraft, but the stabilised platform 8 remains horizontal, and an angular displacement equal to the roll angle will occur between the shaft 5 and the plane of the platform 8. Suppose the apparatus to be in the position drawn (with the mirror looking dead ahead) then the horizontal axis of the mirror through the pins 18 will also tilt through the angle of roll, the rocker member 16 turning about the axis through pins 15 by this angle. If, however, the mirror is considered to be turned through 90°, so that it is looking athwartship, the joints 20 will now have been moved by the ring 9 to such positions as to be equidistant from the bearings 11 in the order 11, 20, 20, 11, and the joints 20 will therefore have moved up or down by equal amounts, so that the mirror is caused by rods 19 to rotate about the axis through pins 18, there being no rotation about the axis through pins 15. The mirror is, in fact, caused to take up its correct azimuthal scanning position irrespective of roll for any azimuth angle, since for mirror positions intermediate between the fore-and-aft and athwartship positions, the joints 20 will take up positions with regard to the axis 11, 11 intermediate between the limiting positions above described, and the rods 19 will transmit corrections resulting in rotations partly about the axis through pins 15, and partly about the axis through pins 18.

It will be noticed that the only parts required to move relative to the aircraft to provide compensation for roll are the parts 8 and 9, the connecting rods 19, the band 17, the rocker member 16 and the mirror itself, the correction applied to the mirror being a function both of the angle of roll and of the momentary scanning position.

In the embodiment of the invention illustrated in Fig. 2, the complexities of the mirror-feeding arrangements described above with reference to Fig. 1 are avoided by fixedly mounting the essential radio-frequency parts 23 of both transmitter and receiver on the back of the mirror 24; the latter is then fed by a fixed, rigid waveguide structure (not shown) and neither a rotating joint nor a flexible waveguide coupling is required.

The mirror 24 is carried on a rotating platform 25 which is constrained to take up the same orientation as a stabilised platform 26; the latter, as is described below, is constrained to remain in a horizontal plane. Platform 25 incorporates a radial-and-thrust ballrace (illustrated in the cut-away portion on the right of the figure) which enables it to rotate freely in platform 26.

A worm 27 and worm wheel 28 drive a shaft 29, which in turn rotates mirror 24 to scan in azimuth. For this purpose, a gimbal ring 30 is mounted on a driving spindle (not shown) passing through shaft 29 and carried in bearings of which one, 31, is seen in the figure: the rotating platform 25 is mounted on the gimbal ring by two bearings at right angles to the driving spindle, one of these bearings being visible at 32. The gimbal ring 30 thus constitutes a universal coupling between the shaft 29 and mirror 24.

Stabilised platform 26 is maintained horizontal by a roll-stabilising control rod 33 and a pitch-stabilising control rod 34, despite movements of the craft. (Parts of the apparatus which move with the main framework of the craft are identified by the common reference 35.) Rod 33 is driven by a gyroscope servo mechanism mounted on the main framework, as indicated diagrammatically in Fig. 2, the drive being transmitted through a pinion 36 and sector 37: a similarly controlled pinion 38 and sector 39 control rod 34. Rod 33 rotates the stabilised platform 26 about a fore-and-aft axis 40, whilst rod 34 maintains platform 26 horizontal against the pitch of the craft.

In this arrangement, the parts which move relative to the craft to provide compensation for roll and pitch are the mirror and apparatus 23, platforms 25 and 26, gimbal ring 30, and the rods 33 and 34 and their operating mechanism.

It is to be understood that the invention is not limited to apparatus for performing any particular scanning motion, nor is it limited to compensation of the effects of roll only.

We claim:

1. A radio scanning apparatus comprising driving means, a shaft having a slot therein and adapted to be driven by said driving means, a radio directional member adapted to be moved by said shaft, a gyroscopically stabilised member, a further member rotatably mounted within said gyroscopically stabilised member and mechanically coupled to said radio directional member, and a pin on said further member engaging with the slot on said shaft.

2. A radio scanning apparatus for a dirigible craft comprising a frame member fixed to said craft so as to partake of the movements thereof in space, a radio directional member, a shaft journaled in said frame member for imparting scanning movement to said radio directional member, driving means for rotating said shaft, a gyroscopically stabilised member surrounding said shaft, a further member also surrounding said shaft coupled with said radio directional member and so mounted with respect to said gyroscopically stabilised member as to be rotatable relatively thereto in the stabilised plane thereof, and a mechanical coupling at least semi-universal in character between said further member and said shaft for transmitting the rotational movement of said shaft to said further member irrespective of the position of the latter with respect to the axis of said shaft.

3. A radio scanning apparatus according to claim 2 wherein said radio directional member is fixedly mounted on said further member and the latter is maintained in a substantially horizontal position by said gyroscopically stabilised member, and wherein said mechanical coupling between said further member and said shaft comprises a gimbal ring.

4. A radio scanning apparatus according to claim 3 including radio frequency means fixedly mounted on said carrier and connected to said radio directional member.

5. A radio scanning apparatus for a dirigible craft comprising a frame member fixed to said craft so as to partake of the movements thereof in space, a radio directional member movable about two mutually perpendicular axes relatively to said craft, driving means including a rotatable member carried by said frame member for imparting scanning movement to said radio directional member, and means connecting said radio directional member to said rotatable member for rotation therewith and movement relatively thereto about a pair of axes perpendicular to one another and normally perpendicular to the axis of rotation of said rotatable member, including a gyroscopically steadied member surrounding said rotatable member, a further member also surrounding said rotatable member and rotatably mounted with respect to said gyroscopically steadied member, a coupling between said further member and said rotatable member for transmitting the rotational movement of the latter to said further member irrespective of the position of said further member with respect to the axis of said rotatable member and means for transmitting the movements of said further member to said radio directional member.

6. A radio scanning apparatus for a dirigible craft comprising a frame member fixed to said craft so as to partake of the movements thereof in space, a radio directional member movable about two mutually perpendicular axes, a scanning shaft journaled in said frame member, means connecting said shaft and said radio directional member for imparting scanning movement to the latter about one of said axes, a gyroscopically steadied member having its gyroscopically controlled plane perpendicular to the axis of said shaft when said craft is at rest, a further member carried by said gyroscopically steadied member and free to rotate with respect thereto in said gyroscopically controlled plane, means driven by said shaft for rotating said further member therewith, and a mechanical coupling between said further member and said radio directional member for moving said radio directional member about said second axis during scanning.

7. A radio scanning apparatus according to claim 2 wherein said gyroscopically stabilised member comprises a platform stabilised in a horizontal plane, and said mechanical coupling between said further member and said shaft comprises a gimbal ring.

8. A radio scanning apparatus for a dirigible craft comprising a frame member fixed to said craft so as to partake of the movements thereof in space, a shaft journaled in said frame member, means for imparting rotational movement to said shaft, a platform carried by said frame member and tiltably mounted thereon for oscillatory movement about at least one of two mutually perpendicular and intersecting axes whose point of intersection lies on the axis of rotation of said shaft, means carried by said frame member and connected to said platform for gyroscopically stabilising the latter by movement thereof about at least one of said axes of oscillatory movement, a further member operatively associated with said platform and so mounted as to be freely rotatable with respect to the latter about an axis passing through the point of intersection of and lying normal to each of said mutually perpendicular axes while being constrained to follow the tilting movements of said platform, means coupling said shaft to said further member for imparting to the latter the rotational movement of said shaft, a radio directional member, and means connecting said further member to said radio directional member whereby the latter is tilted in accordance with the tilting movement of said platform while being rotated in accordance with the rotational movement of said shaft.

ARTHUR T. STARR.
VICTOR J. HAY.

REFERENCES CITED

The following references are of record in the file of this patent:

UNITED STATES PATENTS

| Number | Name | Date |
|---|---|---|
| 1,311,509 | Hebrard | July 29, 1919 |
| 1,733,531 | Dugan | Oct. 29, 1929 |
| 2,369,622 | Toulon | Feb. 13, 1945 |
| 2,407,275 | Hays | Sept. 10, 1946 |
| 2,410,827 | Langstroth et al. | Nov. 12, 1946 |
| 2,415,679 | Edwards | Feb. 11, 1947 |
| 2,415,680 | Hoyt | Feb. 11, 1947 |
| 2,425,737 | Hanna | Aug. 19, 1947 |
| 2,472,824 | Hays | June 14, 1949 |
| 2,475,746 | Kenyon | July 12, 1949 |